(No Model.) 3 Sheets—Sheet 3.
E. H. JOHNSON.
POWER TRANSMITTING DEVICE.
No. 431,811. Patented July 8, 1890.
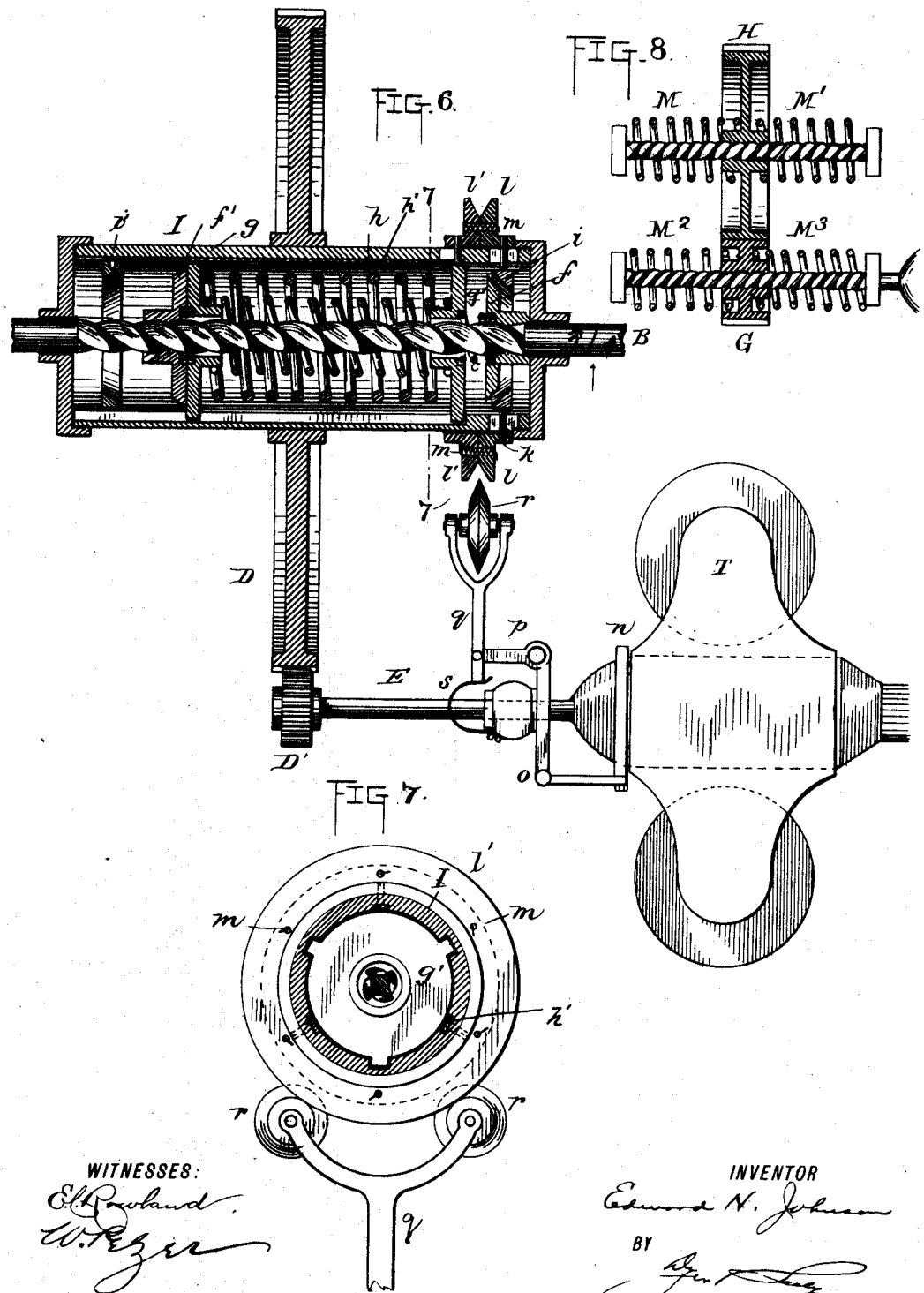
WITNESSES:
INVENTOR
Edward N. Johnson
BY
ATTORNEYS.

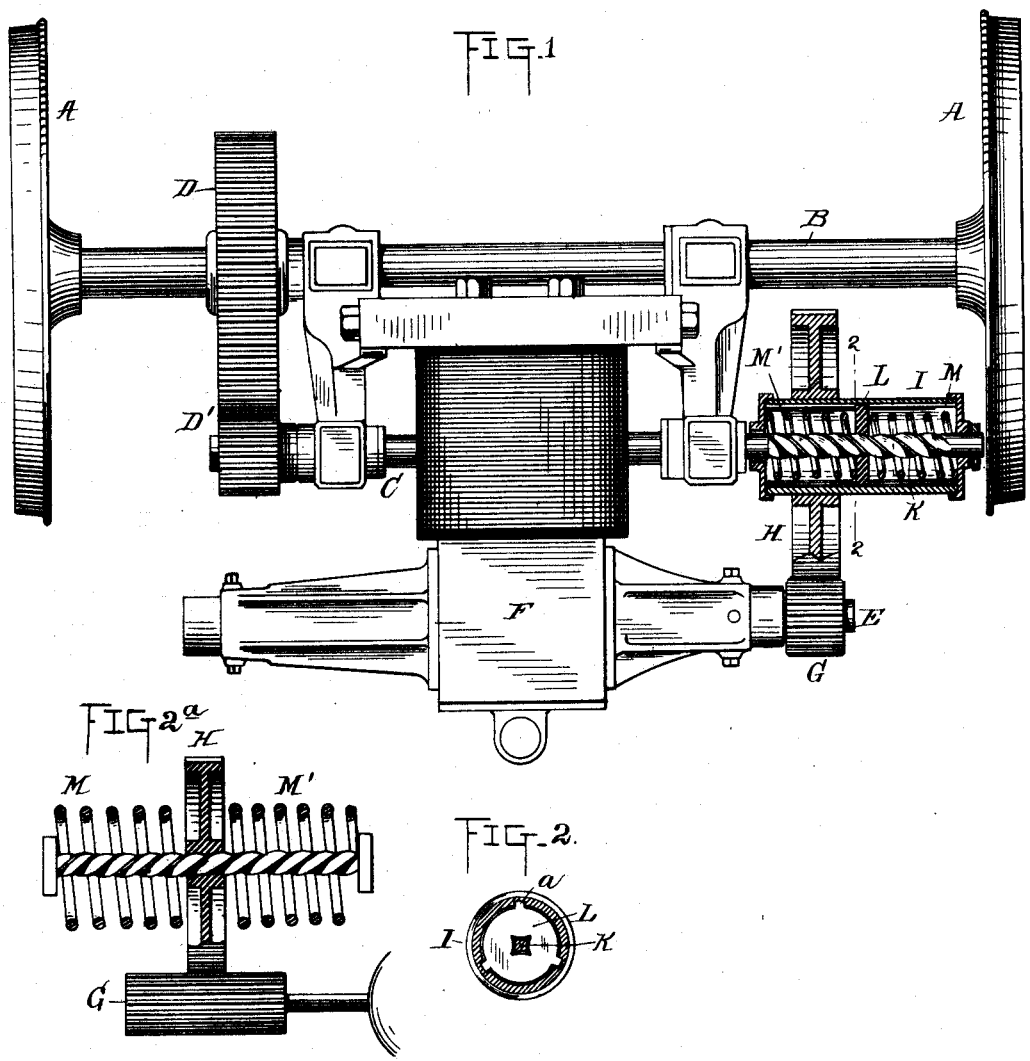

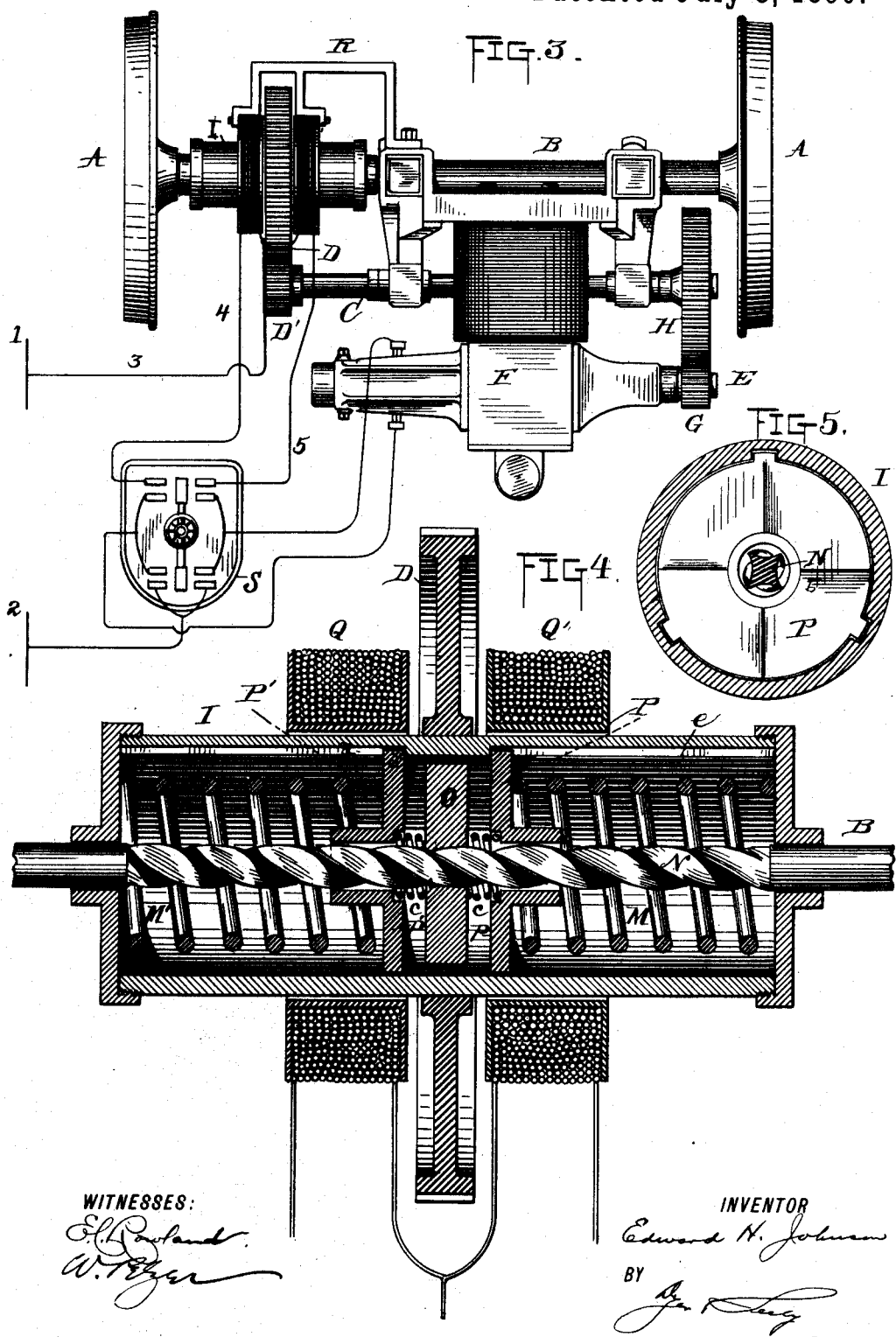

UNITED STATES PATENT OFFICE.

EDWARD H. JOHNSON, OF NEW YORK, N. Y.

POWER-TRANSMITTING DEVICE.

SPECIFICATION forming part of Letters Patent No. 431,811, dated July 8, 1890.

Application filed November 18, 1889. Serial No. 330,746. (No model.)

*To all whom it may concern:*

Be it known that I, EDWARD H. JOHNSON, a citizen of the United States, residing at New York, in the county and State of New York, have invented a certain new and useful Improvement in Power-Transmitting Devices, of which the following is a specification.

My invention relates to devices for transmitting power or motion from a rotating part or body to a part or body designed to be rotated thereby, or usually from a driving-shaft to a driven shaft.

Said invention was designed with especial reference to the transmission of power from the armature of an electric motor to the axle of a railway-car to be propelled by the motor. It is, however, in its more essential features adapted for use in apparatus or machinery of any character in which power is to be transmitted from one shaft to another.

The main objects of my invention are to produce a simple and effective device or apparatus in which the power-transmitting value or capacity of the connection between the two parts will be constantly proportioned to the power required, and which will enable the power to be applied gradually in starting.

Another object which is especially useful in electric-railway cars is to enable the driving-shaft to be readily thrown out of gear with the axle when the car is on a down-grade, or when for other reasons this is desirable.

Heretofore attempts have been made to apply power gradually and in proportion to the load by means of springs connected between the driving and driven body which were wound up or put under tension by the motion of the driving-body until finally they were enabled to move the driven body. Devices, however, which depend on springs for directly transmitting power have practical defects which are well known to mechanics. Devices which depend on the rubbing friction of two opposed surfaces have also been employed; but such devices also have undesirable features.

In my invention I combine the advantages which arise from the use of an intermediate spring and those which attend the employment of friction devices in such manner as to avoid the objectionable features of each, and I accomplish this mainly by the use, in connection with a frictional connecting device, of a compression-spring or other yielding and elastic body which does not form the direct medium for transmission of power, but which determines the frictional engagement of the connecting device, so as to determine the power-transmitting capacity or value of the connection established thereby in accordance with the load or with the power required. I prefer to make use of a part connected with the driving-shaft and movable so as to be brought into frictional connection with the driven shaft, and I so place the elastic determining device that it opposes and limits the movement of the said intermediate part and so determines the degree of friction with which said intermediate part engages the driven shaft. I prefer to screw-thread the driven shaft and make the said intermediate part a nut or other internally-screw-threaded body traveling thereon, the elastic determining device being preferably a compression-spring coiled around the shaft, so that the nut travels against its pressure. Such nut is connected, in some cases permanently and in others temporarily, as will be explained, with the driving-shaft, so that by the movement of the latter the nut is screwed up against the yielding stop or determining device until it reaches a point at which the pressure of the latter is such as to cause the nut to engage the screw-thread on the shaft with sufficient friction to turn the shaft. Upon the stopping of the driving-shaft the nut will run back, under the elastic pressure upon it, along the screw-thread to its former position.

It will be seen that by my invention the power is applied gradually and the value of the frictional engagement and the amount of power transmitted are automatically determined by the work to be done. In other words, I accomplish this result, which I believe to be new, by gradually interlocking a moving and a motionless shaft with an engagement whose value is positively progressive until it equals the work to be done, and is afterward invariably proportional thereto.

It will be seen, also, that the shaft may be automatically disconnected when the power is withdrawn, and that in electric-railway cars the use of my invention enables the armature of the motor to make one or more revolutions before it engages with the axle to start the car, and when the car runs downhill the armature may be disconnected, so that only the wheels of the car will be in motion.

I may in some cases place a device of the kind described on each of two engaging shafts, so that the moving parts on each shaft travel simultaneously when the power is applied until each engages its own shaft with sufficient friction to transmit the power required. This arrangement is desirable in places where space for movement along the shaft is limited.

In addition to the features thus generally set forth, my invention consists in various novel devices and combination of devices employed by me in fully carrying into effect the objects above named, such features being hereinafter described and claimed.

In the accompanying drawings I have mainly illustrated my invention as applied to electric-railway cars; but it will be evident that its uses are not confined to that class of apparatus.

Figure 1 is a plan view of a portion of a street-car truck provided with an electric motor and with devices embodying my invention; Fig. 2, a cross-section of the cylinder, containing the traveling nut on the line 2 2 of Fig. 1; Fig. 2ª, an elevation of a somewhat modified arrangement; Fig. 3, a plan view of the truck and motor, illustrating another form of my invention, in which the nut is normally disconnected from the driving-shaft; Fig. 4, a vertical longitudinal section of the cylinder and gear-wheel in this form; Fig. 5, a cross-section of the cylinder; Fig. 6, a longitudinal vertical section of the gear-wheel and hub in a modified arrangement, in which the temporary connection between the nut and the driving-shaft is made by friction; Fig. 7, a cross-section on the line 7 7 of Fig. 6; and Fig. 8, a view illustrating the modified construction, in which both shafts are provided with flexible power-transmitting devices.

Referring first to Figs. 1 and 2, A A are car-wheels. B is the axle connecting them, and C is a counter-shaft connected with axle B by gear-wheels D' D.

E is the armature-shaft of an electric motor F. Upon the armature-shaft E is a pinion G, which engages with a toothed gear-wheel H. The hub on which the said gear-wheel H is fixed is a hollow cylinder I, sleeved on the counter-shaft C. The portion of said counter-shaft within said cylinder I is formed with a screw-thread K. The pitch of the screw should in all cases be one of such length as to allow the elastic stop to readily reverse the apparatus and force the nut back on the thread. The exact pitch necessary for this is dependent on various conditions, such as the situation in which the device is placed, the amount of movement which may be allowed to the nut, and the strength of the spring, &c.

L is the nut, which forms the intermediate connecting device, such nut being threaded on the shaft C and being provided with lugs $a$, which enter internal slots in the cylinder I.

The operation of these devices is as follows: When the car is in a state of rest, if current is applied to the motor the pinion G turns the wheel H and cylinder I. The nut L, being in positive engagement with the cylinder, turns with it, and is therefore screwed up in one direction or the other, according to the way the armature is running along the shaft and against the spring M or M', until it reaches a point where the compression of the spring is such as to hold it back against the screw-thread with such friction that its turning movement is communicated to the counter-shaft, and the same turns and starts the car at first slowly and with increasing speed as the compression of the spring increases until it reaches such a point that the nut will move no farther, such point being dependent on the load or the amount of resistance to starting which has to be overcome. The difficulty which has constantly arisen in the operation of electric-railway cars is that, while the power required to start the car is greater than that required when in motion, the electrical equipment is then least effective, and must, therefore, for the purpose of starting, be largely in excess of what is subsequently required, and even this provision is not always sufficient to avoid injury to the motor by the excessive current which passes through the armature while the same is at a standstill and is developing no counter electro-motive force. It will be readily seen that these difficulties are materially lessened by the use of the apparatus just described, since the load is brought gradually on the armature by the gradual compression of the spring, and the armature has time to make one or more revolutions and to begin to develop its counter electro-motive force before the load is placed on it. While the car is running the engagement of the shafts alters with variations in the load, so that the value of such engagement and the power transmitted change with the power required—that is to say, the point at which the nut engages with the screw-thread sufficiently to turn the shaft will depend on the load at the time of starting—and if the load afterward increases the nut will run farther up on the screw-thread, or if the load decreases it will be relieved and will run back toward the center.

In the arrangement shown in Fig. 2ª the cylindrical hub is omitted and the gear-wheel H is threaded directly upon the shaft and placed between the springs M M', which are coiled on the shaft between stationary collars. The operation will be readily seen. When the wheel H begins to turn, it runs upon the screw-thread against the spring until it reaches a point where it will turn the shaft. The pinion G is made long enough to permit the movement of the wheel H.

In the forms of my invention so far described the nut is always in engagement with the cylinder, and the armature therefore is always in connection with the axle. In order that, when necessary or desirable, the armature may be automatically disconnected from the axle, so that the axle alone will revolve, I add to the simple construction shown in Fig. 1 certain other devices, (illustrated in the remaining figures of the drawings,) which I shall now describe.

Figs. 3, 4, and 5 illustrate a device in which the nut is normally out of engagement with the cylinder, and is moved bodily into engagement therewith by electro-magnetic attraction. The wheels A, axle B, counter-shaft C, motor F, armature-shaft E, pinion G, and gear-wheel H are arranged substantially as before described; but I have in this case shown the power-transmitting device on the driving-axle instead of on the counter-shaft. It is evident that either situation may be selected for this device, according to the requirements of any particular use.

In Fig. 1 the device is shown on the counter-shaft; but the same device can evidently be placed on the axle, and the different device shown in Fig. 3 may evidently be used as well on the counter-shaft. Neither of course is the use of a counter-shaft in any way essential to my invention, although I have illustrated its use, because it is preferably employed in electric-railway motors.

Referring to Figs. 3, 4, and 5, the axle B is formed with a screw-thread M under the cylinder I, which is loose on the axle, and within said cylinder are compression-springs M M'. Threaded on the shaft of the axle, and situated normally at the middle of the cylinder I, as shown in Fig. 4, is a nut O, which is formed with cam-surfaces adapted to engage with corresponding surfaces on the inner faces of disks P P', situated one on each side of the nut O, held away from said nut by light springs $c$ and provided with lugs $d'$, which enter internal slots $d$ in the cylinder. The cam-surfaces of disk P are shown at $b$ in Fig. 5, and those of the nut O are of a similar character, so as to engage therewith. The nut O is of less diameter than the cylinder, so that it does not come into contact therewith. The disks P P' are loose on the screw-threaded axle. The cylinder forms the hub of the gear-wheel D, which engages the pinion D'. Upon the hub I, on each side of the gear-wheel D, is placed a spool, wound with a wire coil Q or Q'. Such spools may be supported by a bracket R from the motor-bearings, as illustrated in Fig. 3, or in any suitable way. These wire coils are connected with a suitable source of electric current, which, in the case of an electric-railway car, is preferably the source which supplies current to the motor. The source of supply is indicated by the conductors 1 and 2, with which the coils Q Q' are connected by wires 3, 4, and 5 through the switch S. The switch shown is a simple form of switch, which may be used with electric railways for the purpose of opening and closing the motor-circuit, and for the purposes of my invention it is provided with additional connections with the coils Q Q', so that when the handle is thrown to one side or the other to start the motor in one direction or the other it at the same time closes the circuit to either the coil Q or Q'. The nut O being made of magnetic material, when either of the coils is energized such nut is attracted toward such coil, and is therefore brought into engagement with the disk P or P', as the case may be. The cylinder I having at this time begun to revolve because of the application of current to the motor at the same time as to the coil, as soon as the cam-surfaces of O and P engage the nut O begins to turn with the cylinder, and is therefore screwed up along the shaft, pushing the disk P and compressing the spring M in front of it until, as in the previous instance, the spring M becomes so far compressed as to force the nut against the screw-thread with sufficient friction to turn the shaft. When the current is removed from the motor, the nut is run back along the shaft, as before explained, being followed by the disk P until such disk reaches the ends of the slots $e$, when the springs $c$ remove the nut O from the disk P, and so entirely disconnect the armature-shaft from the axle, and the parts remain in this situation until the current is again applied and the coil Q or Q' attracts the nut against one of the loose disks.

It will be seen that all the operations described with reference to Fig. 1 are performed by the device in Figs. 3 and 4; but in addition the latter device enables the armature to be thrown out of gear with the axle when the car is on a downgrade. At such time, current being shut off from the motor, the force which tends to keep the nut O screwed up against the spring is removed, and the spring therefore forces the nut back over the long pitched thread to its central position, with the result already explained.

In the arrangement shown in Figs. 6 and 7 the manner of giving the nut its initial movement, which starts it upon the screw-thread, is a different one from that just described. Instead of moving the nut bodily into engagement with the cylinder, it is made to turn with the cylinder by a temporarily-applied friction device. Such a device may be operated by hand or in any suitable way. I have shown it as operated electrically by the attraction of the field-magnet of the motor with which the device is connected.

In Figs. 6 and 7 I have shown the device applied to a stationary motor T, transmitting power to the shaft B, which may be the shaft of any driven machine or apparatus. The cylinder I is placed over the screw-threaded part of the shaft B and forms the hub of the gear-wheel D, which engages with the pinion D' on the armature-shaft E. The device shown in Fig. 6 differs in many respects from those previously described. Near each end of the screw-thread is placed a threaded nut $f f'$, and two loose disks $g g'$ are placed in proximity to said nuts. At the middle part of the cylinder, between the disks $g g'$, is placed the compression-spring $h$. I prefer to employ two springs, one within the other, as shown. Light springs $c$ are placed between the screw-threaded nuts and the loose disks, as before. Between each nut and the end of the cylinder is placed loosely on the shaft an internally-beveled collar $i i'$. The collar $i$ has extending from it pins $k$, which pass through slots in the cylinder and are attached to a sliding collar $l$ on the outside of the cylinder. The collar $l$ is normally in contact with a similar collar $l'$, they being held together by springs $m$. The collar $l'$ also has pins extending through slots in the cylinder into the interior thereof, such pins being attached to strips $h'$, which extend inside of the cylinder and are attached to the internally-beveled collar $i'$ at the other end of the cylinder. Upon the motor T, in proximity to the poles thereof, is a magnetic bar or plate $n$, from which a bell-crank $o$ extends, connected by a link $p$ with a forked arm $q$, which carries wedges $r$, each consisting of a beveled roller adapted to enter between the collars $l l'$ and to force the same apart. The wedges $r$ are normally held between said collars by a spring $s$, but are withdrawn therefrom by the attraction of the magnet of the motor T for the magnetic bar $n$. As shown, the parts are in operation. When they are at rest and the wedge $r$ is between the collars $l l'$, the inner collar $i'$ is out of contact with the nut $f'$, and so is the collar $i$ out of contact with the nut $f$, being pushed away from it by the strip $h'$. When current is placed on the motor, the cylinder $i$ begins to revolve, and at the same time the wedge is withdrawn, so that the collars $l l'$ are brought together by the springs $m$, and the double collars $i i'$ are brought into frictional engagement with the beveled edges of the nuts $f f'$, respectively, whereupon both said nuts begin to turn with the cylinder, and one or the other of them, according to the way in which the shaft is turned, will be screwed up along the shaft, so that it will engage with the disk $g$ or $g'$, after which it will continue to run up the shaft and compress the spring until it engages with the shaft and turns the same, as already explained. As shown, the shaft is turning in the direction indicated by the arrow in Fig. 6, which screws the nut $f'$ up toward the center of the cylinder and keeps the nut $f$ at the end of the cylinder. If the motor were started the other way, these conditions would be reversed.

When the current is taken off the motor, the nut $f'$ will run back, but will not come into contact with the collar $i'$, because the wedges $r$ will be forced into place again and keep said collars so near the end of the cylinder that the hub of the nut will strike the end of the cylinder before the nut reaches the collar.

In Fig. 8 is shown the simple form of my invention shown in Fig. 2$^\text{A}$ to illustrate the application of my invention to both shafts. The gear-wheel H is threaded on the driven shaft between the springs M M'. The pinion G is threaded on the driving-shaft between springs M$^2$ M$^3$. When the driving-shaft starts, the pinion G, being prevented at first from turning by its engagement with the motionless driven shaft, will be screwed up against one of the springs until it engages the shaft with such force as to start the wheel H, which will then be screwed along its shaft until it also turns the same. It will be seen that the longitudinal movement is thus divided between the two shafts, so that the movement on any one shaft is less than that which would otherwise be required.

What I claim is—

1. The combination of a driving-shaft, a driven shaft, a frictional connecting device for transmitting motion between said shafts, and an elastic determining device determining the frictional engagement, substantially as set forth.

2. The combination of a driving-shaft, a driven shaft, an intermediate part in connection with one of said shafts and adapted to be brought into frictional connection with the other, and an elastic determining device determining the frictional engagement, substantially as set forth.

3. The combination of a driving-shaft, a driven shaft, an intermediate part connected with one of said shafts and movable along the other to a point at which it engages therewith, and an elastic determining device determining the point of engagement, substantially as set forth.

4. The combination of a driving-shaft, a driven shaft, an intermediate part in frictional connection with each of said shafts, said intermediate parts being in direct engagement with each other, and an elastic determining device for each shaft, determining the frictional engagement therewith, substantially as set forth.

5. The combination of a driving-shaft, a driven shaft, an intermediate part movable along each shaft to a point at which it engages therewith, said parts being in direct engagement with each other, and an elastic determining device on each shaft, determining the point of engagement therewith, substantially as set forth.

6. The combination of a driving-shaft, a driven shaft, one of said shafts having a screw-thread, a movable body threaded on the threaded shaft and connected with the other shaft, and an elastic cushion opposing the travel of said body on the shaft, substantially as set forth.

7. The combination of a driving-shaft, a driven shaft, one of said shafts having a screw-thread, a movable body threaded on the threaded shaft and connected with the other shaft, and an elastic cushion on each side of said body opposing its movement in either direction, substantially as set forth.

8. The combination of the armature-shaft of an electric motor, a driven shaft, an intermediate part in connection with one of said shafts and adapted to be brought into frictional connection with the other, and an elastic determining device for determining the frictional engagement, substantially as set forth.

9. The combination of a driving-shaft, a driven shaft, both of said shafts being screw-threaded, a movable body threaded on each of said shafts, said bodies being in direct engagement with each other, and an elastic cushion on each shaft opposing the movement of the threaded body thereon, substantially as set forth.

10. The combination of a driving-shaft, a driven shaft having a screw-thread, a pinion on the driving-shaft, a gear-wheel on the driven shaft, a hollow hub for said gear-wheel, a nut threaded on the shaft within said hub and engaging with said hub, and an elastic cushion opposing the travel of said nut on the shaft, substantially as set forth.

11. The combination of a driving-shaft, a driven shaft having a screw-thread, a pinion on the driving-shaft, a gear-wheel on the driven shaft, a hollow hub for said gear-wheel, a nut threaded on the shaft within said hub and engaging with said hub, and an elastic cushion on each side of said nut opposing the travel of said nut on the shaft, substantially as set forth.

12. The combination of a driving-shaft, a driven shaft, an intermediate part normally disconnected from both shafts and adapted to be brought into frictional connection with the driven shaft when moved by the driving-shaft, means for placing said intermediate part in connection with the driving-shaft, and an elastic determining device determining the frictional engagement with the driven shaft, substantially as set forth.

13. The combination of a driving-shaft, a driven shaft, an intermediate part normally disconnected from both shafts and adapted to be brought into frictional connection with the driven shaft when moved by the driving-shaft, electrically-operated means for placing said intermediate part in connection with the driving-shaft, and an elastic determining device determining the frictional engagement with the driven shaft, substantially as set forth.

14. The combination of the armature-shaft of an electric motor, a driven shaft, an intermediate part normally disconnected from both shafts and adapted to be brought into frictional connection with the driven shaft when moved by the driving-shaft, means for placing said intermediate part in connection with the driving-shaft, and an elastic determining device determining the frictional engagement with the driven shaft, substantially as set forth.

15. The combination of a driving-shaft, a screw-threaded driven shaft, a nut on the screw-thread, means for bringing said nut into engagement with the driving-shaft, and an elastic cushion opposing the travel of said nut on the screw-thread, substantially as set forth.

16. The combination of a driving-shaft, a screw-threaded driven shaft, a nut on the screw-thread, a loose disk on the driven shaft engaging with the driving-shaft, means for moving said nut into engagement with said disk, and an elastic cushion opposing the travel of said nut on the screw-thread, substantially as set forth.

17. The combination of a driving-shaft, a screw-threaded driven shaft, a nut placed centrally on the screw-thread, a loose disk on the shaft on each side of said nut, respectively, means for moving said nut into engagement with either of said disks, and an elastic cushion behind each of said disks opposing the travel of said nut on the shaft in either direction, substantially as set forth.

18. The combination of a driving-shaft, a screw-threaded driven shaft, a hollow hub for the gear-wheel on the driven shaft, a nut threaded on the shaft within said hub, a loose disk on the shaft keyed to said hub, means for moving said nut into engagement with said disk, and an elastic cushion opposing the travel of said nut on the screw-thread, substantially as set forth.

19. The combination of the armature-shaft, an electric motor, a driven shaft, an intermediate connecting device normally out of connection with both shafts and adapted to be brought into frictional connection with the driven shaft when moved by the driving-shaft, and means operated by the current supplying the motor for moving said device into engagement with the armature-shaft, substantially as set forth.

20. The combination of the armature-shaft, an electric motor, a driven shaft, an intermediate connecting device normally out of connection with both shafts and adapted to be brought into frictional connection with the driven shaft when moved by the driving-shaft, an electro-magnetic device energized by the motor-current for moving said connecting device into engagement with said armature-shaft, and a switch controlling the current to said electro-magnetic device simultaneously with the current to the motor, substantially as set forth.

21. The combination, with an electric-railway motor and the axle which it drives, of an intermediate loose connecting device, and an electro-magnetic apparatus controlled by the motor-switch for throwing said device into and out of engagement, substantially as set forth.

22. The combination of a driving-shaft, a screw-threaded driven shaft, a nut on the screw-thread, a loose disk on the driven shaft engaging with the driving-shaft, means for moving said nut into engagement with said disk, an elastic cushion opposing the travel of said nut on the screw-thread, and a spring between said nut and said loose disk, substantially as set forth.

This specification signed and witnessed this 16th day of November, 1889.

EDWD. H. JOHNSON.

Witnesses:
 H. W. SEELY.
 WILLIAM PELZER.